Sheet 2.
5 Sheets.

W. N. Whiteley Jr.
Harvester Rake.
Nº 51374     Patented Dec. 5, 1865.

Witnesses.
J. D. Willoughby
John M. Merryman

Inventor.
Wm N. Whiteley Jr.
By his atty –
R. D. O. Smith

W. N. Whiteley, Jr.
Harvester Rake.
N° 51374        Patented Dec. 5, 1865.

Witnesses.
J. D. Willoughby
John M. Merryman

Inventor.
Wm. N. Whiteley Jr.
By his atty —
R. D. O. Smith

Sheet 4.
5 Sheets.

W. N. Whiteley, Jr.
Harvester Rake.
Nº 51374      Patented Dec. 5, 1865.

Witnesses.
J. D. Willoughby
John M. Merryman

Inventor.
Wm. N. Whiteley Jr
By his atty
R. D. O. Smith

W. N. Whiteley, Jr.
Harvester Rake.
Nº 51374    Patented Dec. 5, 1865.

Sheet 5.
5 Sheets.

Witnesses.
J. D. Willoughby
John M. Merryman

Inventor.
Wm N. Whiteley Jr.
By his atty —
R. D. O. Smith

UNITED STATES PATENT OFFICE.

WILLIAM N. WHITELEY, JR., OF SPRINGFIELD, OHIO.

IMPROVEMENT IN HARVESTERS.

Specification forming part of Letters Patent No. 51,374, dated December 5, 1865

*To all whom it may concern:*

Be it known that I, WILLIAM N. WHITELEY, Jr., of Springfield, in the county of Clarke and State of Ohio, have invented certain Improvements in Harvesting-Machines; and I do hereby declare the following to be a full, clear, and exact description of the same, reference being had to the accompanying drawings and letters of reference marked thereon, in which—

Figure 1:
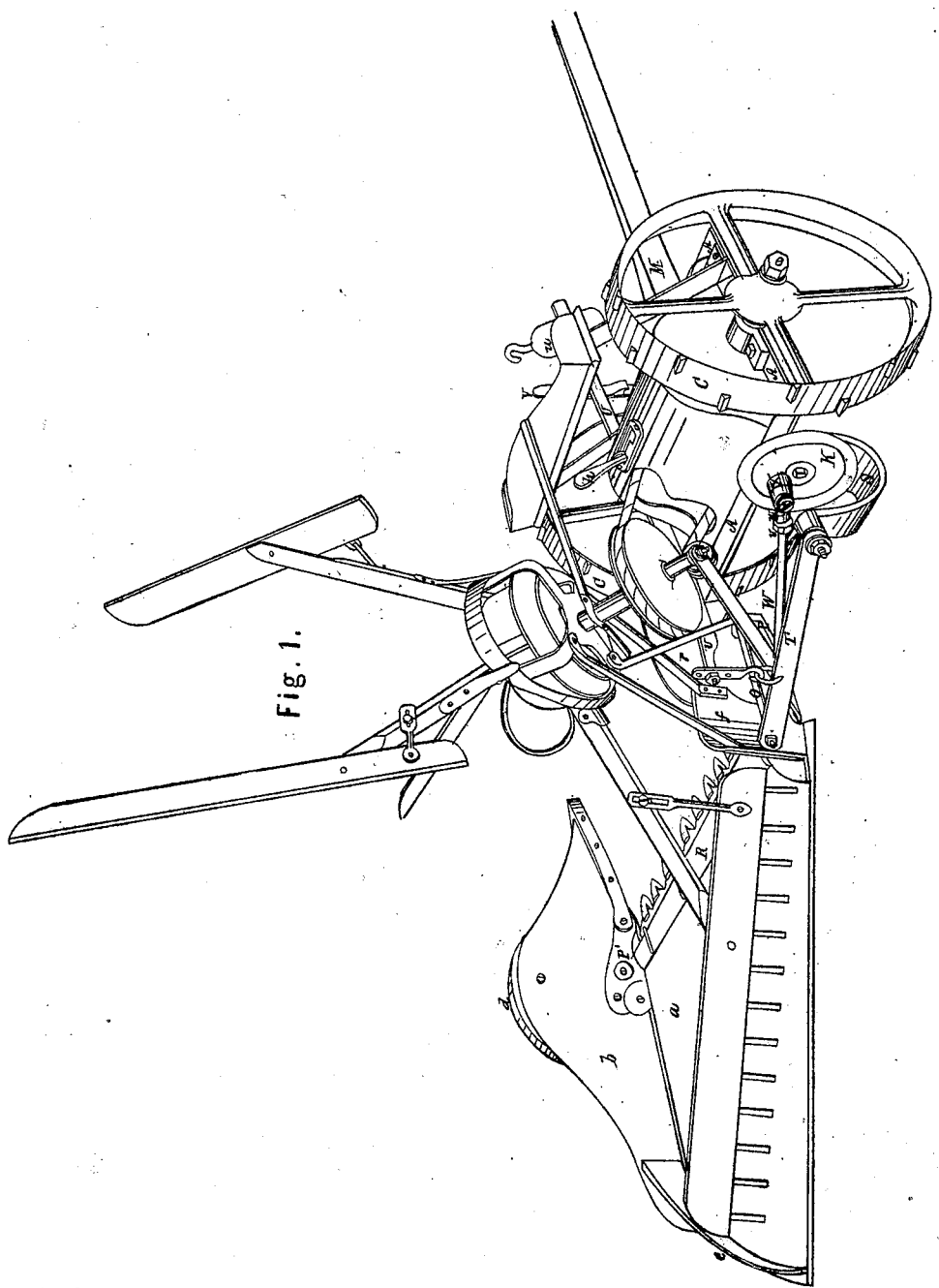
Figure 2:
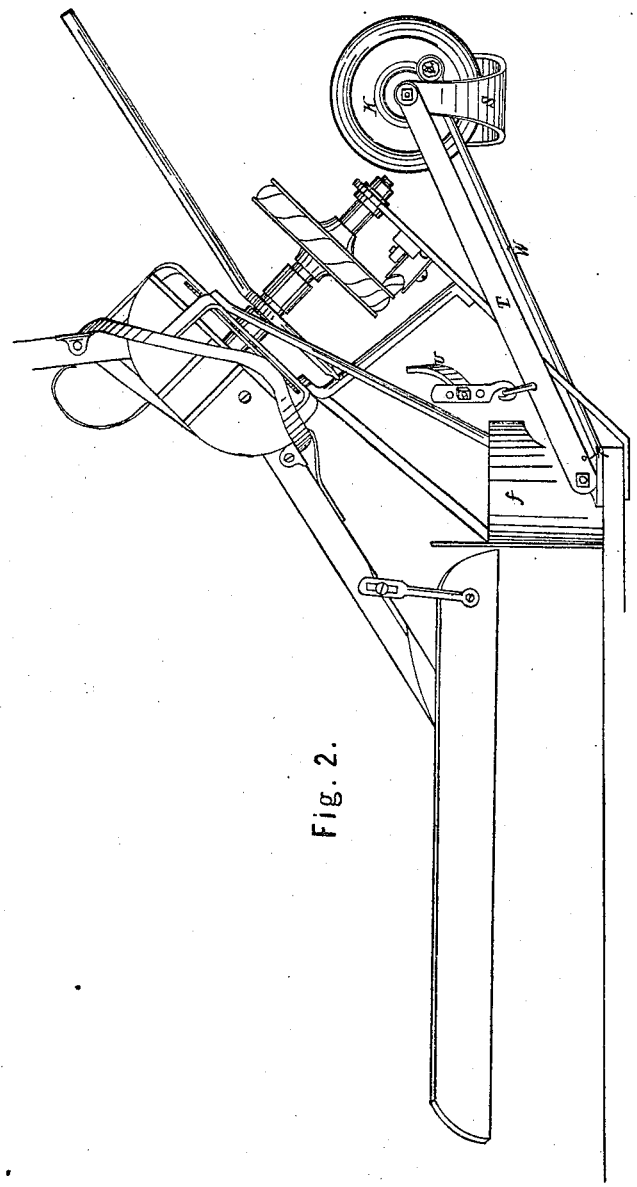
Figure 4:
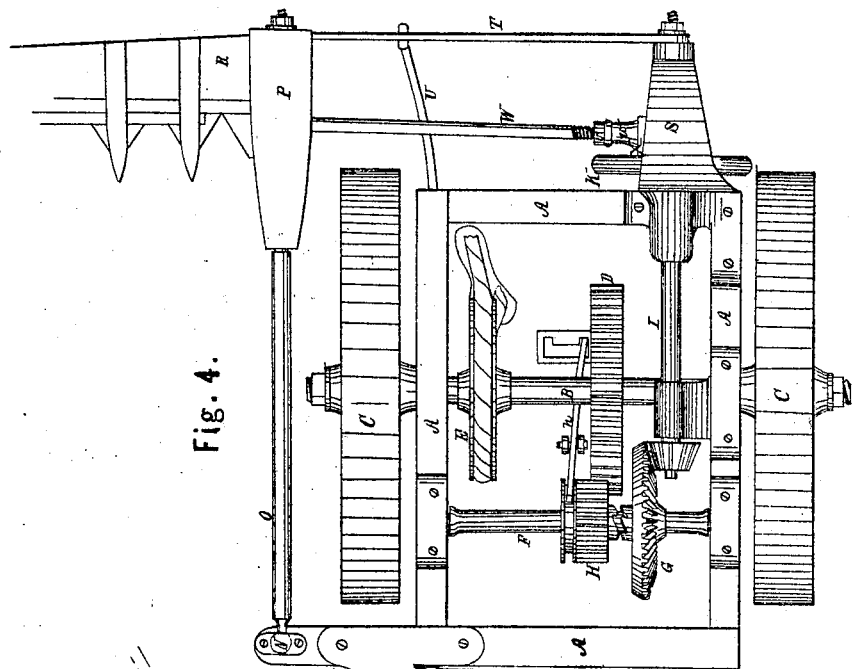
Figure 3:
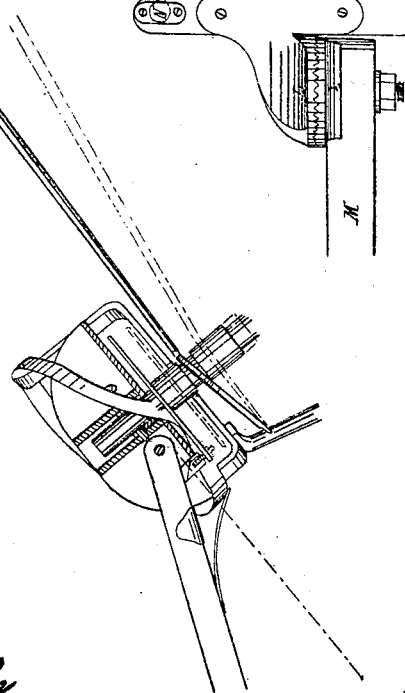
Figure 5:
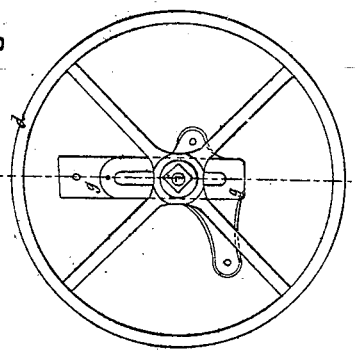
Figure 6:
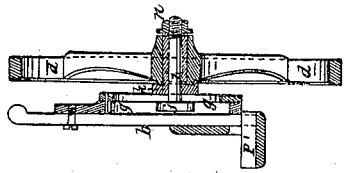
Figure 10:
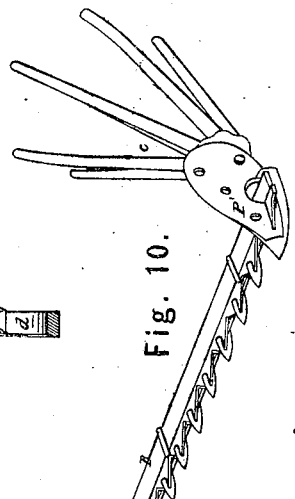
Figure 7:
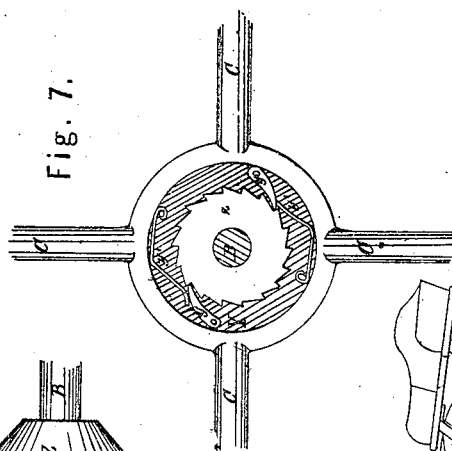
Figure 8:
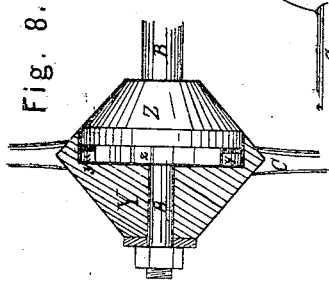
Figure 9:
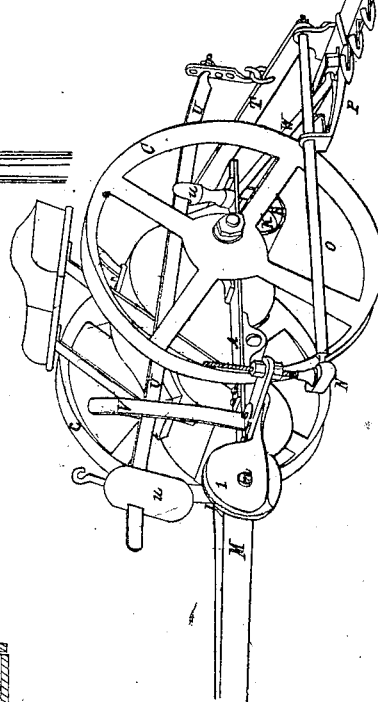
Figure 12:
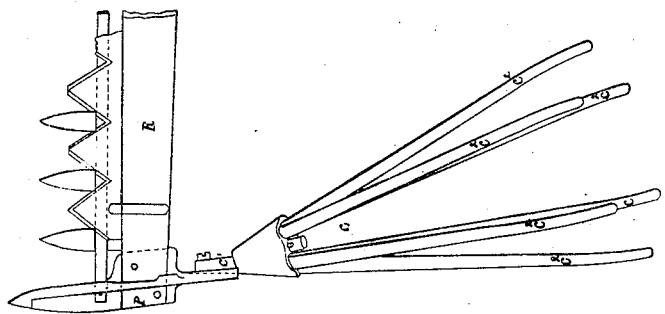
Figure 11:
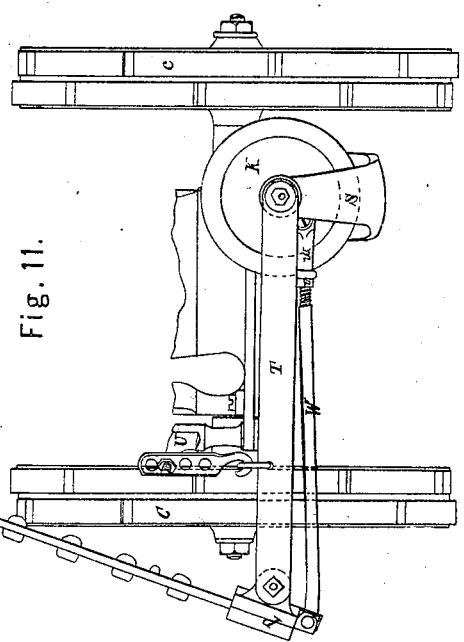

Figure 1 is a perspective view of my machine when arranged as a reaper, taken from the rear. Fig. 2 is a rear elevation of the reel and rake stand. Fig. 3 is a vertical section of the reel and rake stand. Fig. 4 is a bottom plan of the main frame and driving mechanism. Fig. 5 is an elevation of the grain-wheel, showing the method of adjusting it to any desired height. Fig. 6 is a vertical section of the same. Fig. 7 is an elevation of the inner side of the hub of the driving and bearing wheels, showing the ratchet and pawl which allows said wheel to turn backward without operating the machine within the frame. Fig. 8 is a vertical cross-section of the same. Fig. 9 is a cross-section of the pitman's wrist or attachments. Fig. 10 is a perspective view of my machine arranged as a mower. Fig. 11 is a rear elevation of the same, showing the sickle folded for transportation. Fig. 12 is a plan of the outer end of the sickle and finger-bar, showing the revolving track-clearer in place.

My invention consists, mainly, in the devices by which I connect the tongue to the main frame of the machine, making it rigid at any point or angle desired; the arrangement of devices for raising, lowering, and balancing the cutting apparatus; the method of attaching the drag-bar to the front bar of the main frame, &c.

That others skilled in the art may understand the construction and operation of my invention, I will particularly describe it.

A is the main frame of the machine, supported upon the axle B and wheels C C. Upon the axle B is the main driving cog-wheel D (see Fig. 4) and the reel's driving-pulley E.

F is a counter-shaft parallel to the main axle-shaft, but preferably a little below its level. Upon the counter-shaft F is the bevel-driver G and clutch-pinion H, the latter being geared into the main driver D.

At right angles to the main axle B and counter-shaft F is the crank-shaft I, with a bevel-pinion, J, upon its inner end, (which gears into the bevel-driver G,) and the crank-wheel K upon its outer end and outside of the main frame. The main axle B is supported in position by suitable boxes on the upper side of the main frame, while the counter-shaft F and crank-shaft I, both on the same level, have suitable boxes on the under side of the said main frame. In order to control the clutch-pinion H the clutch-rod $h$ is provided, passing upward to a point convenient to the hand or foot of the driver when on his seat, so that he can at will connect or disconnect the cutters and the driving-wheels.

To the front bar of the main frame is secured the radially-serrated vertical disk L, and rigidly attached to the tongue M is a corresponding radially-serrated vertical disk, $l$. The bolt $m$ passes through both disks L and $l$, and, being provided with a head at one end and a nut at the other, may be made to hold them fast or loose at pleasure. When the nut is tightened the serrations on the two disks mesh together, and they then cannot possibly move independently of each other. In this way the tongue is made rigid to the frame and at any desired angle of elevation, for it is evident that if the nut on the bolt $m$ be loosened so as to free the serrations from each other, then the tongue can be raised or lowered at will, the disk $l$ rotating upon the bolt $m$ as an axis.

The front bar of the main frame is projected past the inner driving-wheel, C, and to the outer end of the said front bar is the pendent stud N, Figs. 4 and 10, which passes through a suitable aperture in the end of the said front bar, and is firmly secured there by two jam-nuts, one on the under and one on the upper side of the bar, so that the distance of its projection downward can be regulated and altered at pleasure. To the lower end of this stud, by a ball-and-socket joint, is secured the drag-bar O, the rear portion of which passes through holes in the elevated ends of the shoe P, to which is attached, in the ordinary manner, the finger-bar R of the cutting apparatus. It also passes through the outer end of the coupling-arm T, and forms the center upon which the said shoe and cutting apparatus turn when vibrating by the undulations of the ground or being folded for transportation.

To the rear bar of the main frame, and near its outer corner, is secured the arm S, which first bends downward, and then curves backward and upward again until its rear end is as high as its forward end and its curve embraces within it the crank-wheel K, which is thereby shielded and protected from any harm or interference from any object over which the machine passes. The forward end of the arm S, at the part where it is secured to the main frame, also forms the box or bearing for the rear end of the crank-shaft I.

To the rear end of the arm S, in line with the axis of the crank-shaft I, is pivoted the coupling-arm T, the other end of the same arm being pivoted by the rear end of the drag-bar O to the shoe P, which is thereby kept at its proper distance from the main frame. The coupling-arm T also serves to raise, adjust, and control the height from the ground of the shoe P and inner end of the finger-bar and sickle, and when the machine is used for mowing it will raise from the ground the entire cutting apparatus. This is accomplished by the lever U, which is linked to the coupling-arm T at a point near its outer end, and thence passes forward over the fulcrum-post $u$ and past the standard V, to which it may be secured at any convenient point, if desired, and projects beyond the front bar of the main frame.

The sickle is driven by the pitman W from the crank-wheel K, in the ordinary manner. In order to render the length of the pitman accurately adjustable, so that the position of the sickle-stroke may be fully under control, the end of the pitman-rod W (see Fig. 9) is screwed into the sleeve $w$ and the nut $v$ is set down hard, so that the pitman cannot by any possibility work loose. The wrist-pin X is not solidly attached to the crank-wheel K, but is firmly held in place by the screw-bolt $z$, which passes through it endwise, and screws into the wheel K, as represented. This arrangement affords facilities for lengthening or shortening the sickle-stroke, as the wrist-pin may thus be moved nearer or farther from the center at pleasure.

As both bearing-wheels are connected to the main driving-shaft in such a way as to become driving-wheels, it is necessary to make provision against the effect of unequal speed as between the bearing-wheels, which will occur in turning, &c. In order to do this the ratchet-and-pawl arrangement shown in Figs. 7 and 8 has been adopted. In these figures, Y represents the hub of the wheel, and Z, a supplementary hub attached to the main axle B. On the inner side of the hub Y is a circular recess of depth sufficient to contain the ratchet and pawls and to allow the supplementary hub Z to enter a distance sufficient to exclude dust and dirt as much as possible from the interior space of said recess. $y y$ are the pawls, pivoted to the bottom surface of the said recess upon opposite sides, and as near the walls as convenient. The ratchet $z$ is rigidly attached to or forms a part of the supplementary hub Z, and when the wheel C is in place upon the axle B, Fig. 8, the ratchet projects into and fills the lateral space of the recess above mentioned, so that the pawls $y y$ are opposite to the teeth of the ratchet $z$, and are forced to engage with them by the springs $y' y'$, which are also located within the recess referred to, and constantly press upon the outer edges of the pawls, forcing them inward or toward the ratchet.

From an inspection of Figs. 7 and 8 and the foregoing description it will appear evident that if the wheel C be turned forward the pawls $y y$ will engage with the teeth of the ratchet $z$ and force the said ratchet and the shaft B, to which it is rigidly attached, to turn at the same time and at the same speed; but if the same wheel be turned backward, the pawls will follow over the inclined surfaces of the teeth of $z$, the springs $y' y'$ allowing the pawls to give back, and the ratchet $z$ and axle B will not be obliged to turn with said wheel. So, also, if the two wheels C C revolve at unequal speeds, the wheel which revolves the faster will operate the axle B at its own speed, while the other wheel will lose a tooth, or more or less, according to the different relative speeds of the two wheels.

The parts of this machine hitherto described are essential parts, necessary to its operation independent of its special uses as a reaper or as a mower. I shall now make allusion to such of the additional parts as are peculiar to its functions as a mower, and afterward to such of the additional parts as are required to enable it to perform as a reaper.

Figs. 10, 11, and 12 represent my machine as arranged for mowing. It then comprises the bearing-wheels with the mechanism and parts already described, and in addition the weight $u$ upon the forward end of the lever U and the revolving track-clearer $c$, attached to the shoe P' at the outer end of the finger-bar.

As is shown in Figs. 10 and 11, the finger-bar is hung upon the drag-bar O at its rear end, and in such a way that the said drag-bar forms an axis around which the finger-bar may partially revolve, as shown in said Fig. 11, where the finger-bar is represented as folded for transportation or storage. The objects of this arrangement are manifold. By permitting the cutters to rise and fall vertically upon the said axis the outer end of the cutting apparatus may ride over elevations, or sink into depressions without affecting the inner end, and the inner end of the said apparatus may likewise ride over elevations or sink into depressions of the surface without affecting the outer end, and thus, notwithstanding the inequalities of the ground over which the machine is passing, the cutting apparatus will always conform thereto, except when raised purposely by means of the lever U. It is likewise desirable to fold the cutting apparatus back upon the other parts of the machine for convenience of stowage, and to remove it from the ground and consequent danger of injury during transportation to and from the field.

The weight of the cutting apparatus is necessarily considerable, and as the shoes P and P' run upon the ground, the consequent friction adds materially to the power required to draw the machine. I therefore place upon the forward end of the lever U the weight $u$, which, acting through the long arm of a lever of the first order, may be made to balance very accurately the weight of the shoe P and attachments. The counterpoise $u$ being placed upon the lever U at a point where it will almost but not quite overbalance the weight of the shoe P and attachments, it follows that the said shoe will press very lightly upon the ground, and will consequently encounter but little friction as it passes along. The shoe will rise and fall with the undulations of the ground without adding materially to the resistance or draft of the machine, and if it is necessary to raise the finger-bar in order to pass over an obstruction in its road, the lever U is convenient to the foot or hand of the driver, and, with the assistance of the weight $u$, the cutting apparatus can be raised with but very small effort. The inner end of the cutting apparatus (shoe P) may be raised only a short distance from the ground without affecting the outer end, $P^2$, for when the lower edge of the coupling-arm T, at its outer end, comes in contact with the horizontal surface of the shoe P, (see $o$ and $p$ and red lines, Fig. 2,) it is evident no further movement on its axis can take place, and thereafter the outer end of cutting apparatus must rise from the ground also, the coupling-arm T and the cutting apparatus forming but a rigid part, having an axis of motion only at the inner end of T, where it is pivoted to the arm S. This feature is not accurately represented in Fig. 2 of the drawings, the distance between the surfaces $o$ and $p$ being too great, as represented.

The outer shoe, P, stands with its point a little inclined outward, as seen in Fig. 12. To its rear portion is secured the spindle $c'$, upon which turns freely the metallic head of the revolving track-clearer $c$. Slender fingers are inserted, in suitable holes in the rear end of the metallic head, upon the spindle $c'$ in such a way that as they project they also diverge from each other, as shown in Figs. 10 and 12, the rear end of each finger being slightly bent inward again. The two fingers which happen to be lowermost drag upon the ground and rise and fall with any undulations thereof, as the spindle $c'$ has a free vertical movement on the bolt which secures it to the shoe P'. The spindle $c'$ is bent sidewise a little, so that the cylindrical portion of it stands in a position more oblique to the line of the machine's movement than the position of the shoe P'. The obliquity of $c'$ is such that the outermost of the diverging fingers of the track-clearer $c^2$ lies about in line with the machine's path, and the inner one of said fingers must therefore be inclined considerably toward the inner side of the machine. The metallic head $c$ turns freely on the spindle $c'$; and it is therefore obvious that as the track-clearer is drawn along, the inner fingers, projecting backward at an angle of considerable obliquity to the path of the machine, and dragging also on the ground, will cause the head $c$ and the whole track-clearer to turn on the spindle $c'$, and the upper fingers, moving toward the inner side of the machine, will carry with them such of the cut grass as falls upon them. In this way a sufficient portion of the cut grass is conveyed bodily toward the inner end of the cutting apparatus to leave a clear path next the standing crop sufficiently wide for the horses and running part of the machine to travel in during the next round.

I will now enumerate those additional parts of my machine that are required to adapt it to its duties as a reaper.

The first is the platform $a$, which is secured to the rear edge of the finger-bar in any suitable way. In form it is nearly a quadrant. It is securely bolted at its outer end to the shoe P' and at its inner end to the shoe P.

The side board $b$ is attached to the outer edge of the platform $a$, extending forward and backward from the end of the finger-bar not parallel to the line of the machine's movement, but with the forward end inclined outward a little, so that a line drawn from the said forward end backward and parallel to the line of the machine's movement would fall just outside of the grain-wheel $d$, which supports the outer end of the cutting apparatus and platform at the requisite height from the ground. The forward point of the side-board $b$ thus serves as a divider and gatherer, to gather in and convey to the cutters all that grain which stands between the two parallel lines running forward from the inner side of the outermost finger, against which the crop is cut, and the outer side of the grain-wheel $d$, so that the said wheel $d$ does not run upon the standing crop, but upon the stubble of grain which has already been cut.

From the rear end of the side-board $b$ the side-board $e$ extends in a curve around to the discharging edge of the platform, and serves to retain upon the platform grain which would otherwise be pushed off directly in the rear of the machine, instead of being discharged considerably at one side, as at the rear or discharging edge of the platform.

At the inner end of the platform is the side-board $f$, which serves to retain the grain upon the platform, which otherwise might be pushed off its inner edge.

It may sometimes happen that the machine will be driven a little too deep into the standing crop, and the gather-board $r$ is attached to the side-board $f$ and the drag-bar O, extending as far forward as the front end of said drag-bar, so that whatever grain may be standing beyond the inner line of cutters will nevertheless be conveyed to the cutters and severed.

In attaching the grain-wheel to the machine I use the slotted plate $g$, which is bolted securely to the vertical flange of the outer shoe, P', and the side-board $b$. Through the slot in $g$ is passed the bolt $i$, which is provided with the large head $j$. The sleeve $k$ is slipped over the bolt $i$ and the hub of the wheel $d$ is put over the sleeve $k$, so that when the nut $n$ and washer are screwed down hard upon the end of the sleeve, clamping the same fast to the plate $g$, the wheel $d$ will be sufficiently free to enable it to turn easily. It is thus seen that in order to vary or regulate the height of the outer end of the cutting apparatus it will only be necessary to loosen the nut $n$, which serves to retain the wheel $d$ upon its axle, and also to clamp the sleeve $k$, when said sleeve-axle may be slipped up or down upon the plate $g$ at pleasure, and may be fastened and held at any desired point by again tightening the said nut $n$.

When reaping, the forward end of the lever U is depressed until the inner end of the cutting apparatus is sufficiently elevated, when it is secured at that point by engaging with a notch on the standard V, prepared for the purpose, or by any other suitable means.

In reaping, the weight $u$ may be removed, if desired.

It is my intention to make a separate application for Letters Patent for my invention of an automatic rake and reel, as represented in the drawings hereunto attached. It is not, therefore, necessary that any further description should be given.

The operation of my machine, as embraced in this patent, is as follows: The proper level of the machine is first secured by adjusting the tongue to the proper height for the horses to be used. This is done by loosening the nut on the bolt $m$, whereby the disks L and $l$ will be allowed to move asunder far enough to disengage their serrations, when the front end of the tongue may be raised or lowered as required, and secured in that position by again tightening the nut.

If the machine is to be used for mowing, and has been divested of its platform, &c., the cutting apparatus may be folded over upon the machine, as shown in Fig. 11, the clutch-pinion H thrown out of gear, and the machine may be drawn forward without operating the cutting apparatus. When the field is reached the cutting apparatus is placed upon the ground, the machinery thrown into gear, and it is ready for operation.

If the machine be arranged as a reaper, then the cutting apparatus cannot be folded over, nor must the forward end of the lever U be left free, as when mowing. The other adjustments are the same as when mowing, and require no further setting forth.

Having described my invention, what I claim, and desire to secure by Letters Patent, is—

1. The radially-serrated plates L and $l$, in combination with the bolt $m$, the tongue M, and main frame A, for the purpose of making the said tongue rigid at any angle of elevation that may be desired.

2. In combination with the cutting apparatus and coupling-arm T, the lever U and counterpoise $u$, as and for the purpose set forth.

3. In combination with the drag-bar O, the adjustable pendent stud N, substantially as and for the purpose set forth.

4. In combination with the drag-bar O and pendent stud N, the shoe P and coupling-arm T, when constructed and connected substantially as described.

5. In combination with the crank K and pitman W, the sleeve X and bolt $x$, substantially as set forth and described.

WM. N. WHITELEY, Jr.

Witnesses:
E. CROPLAND,
GEO. ARTHUR.